United States Patent
Chansungsan (10) Patent No.: US 6,744,275 B2
(45) Date of Patent: Jun. 1, 2004

(54) TERMINATION PAIR FOR A DIFFERENTIAL DRIVER-DIFFERENTIAL RECEIVER INPUT OUTPUT CIRCUIT

(75) Inventor: Chaiyuth Chansungsan, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 73 days.

(21) Appl. No.: 10/061,530

(22) Filed: Feb. 1, 2002

(65) Prior Publication Data

US 2003/0146772 A1 Aug. 7, 2003

(51) Int. Cl.$^7$ ............................................. A03K 17/16
(52) U.S. Cl. ............................ 326/30; 326/32; 326/33; 326/34
(58) Field of Search ................................ 326/30–34, 86

(56) References Cited

U.S. PATENT DOCUMENTS 5,559,448 A * 9/1996 Koenig .......................... 326/30
6,418,500 B1 * 7/2002 Gai et al. ..................... 710/305

FOREIGN PATENT DOCUMENTS

| EP | 0 969 633 A2 | 1/2000 |
| WO | PCT-WO 00/65788 A1 | 11/2000 |
| WO | PCT/US 03/02170 | 6/2003 |

OTHER PUBLICATIONS

Mehdi M. Mechaik, "An Evaluation of Single–Ended and Differential Impedance in PCBs", IEEE, 0–7695–1025–6/01, 2001, pp. 301–306.

"Low Voltage Differential Signaling (LVDS) Technology: The Basics", Texas Instruments web–page news release, Semiconductor News and Publications, Http://www/ti.com/sc/docs/news/1998/98068b.htm, Copyright 2000, 5 pages.

"FAQ: What is a differential signal?", Lattice Semiconductor Corporation web–page, http://www.latticesemi.com/support/faq/FAQ_ispPAC15.cfm, Nov. 28, 2001, 3 pages.

William J. Dally, "Modeling and Analysis of Wires", Digital Systems Engineering, Published 1998, pp. 110, 111, 200, 201, and 202.

* cited by examiner

Primary Examiner—Anh Tran
(74) Attorney, Agent, or Firm—Blakely, Sokoloff, Taylor & Zafman LLP (57) ABSTRACT

Various apparatuses and methods are described that include a variable-impedance matched termination pair coupled to differential signaling bus pair. In an embodiment, the differential signaling bus pair includes a first bus and a second bus. The variable-impedance matched termination pair includes a first variable-impedance component and a second variable-impedance component. The impedance value of each variable-impedance component depends on the voltage level sensed by that variable-impedance component. The first variable-impedance component couples to the first bus. The second variable-impedance component couples to the second bus. The first variable-impedance component is electrically isolated from the second variable-impedance resistor.

31 Claims, 9 Drawing Sheets

TERMINATION PAIR FOR A DIFFERENTIAL DRIVER-DIFFERENTIAL RECEIVER INPUT OUTPUT CIRCUIT

FIELD OF THE INVENTION

This invention generally relates to impedance matched termination pairs coupled to a differential signaling input output circuit. More particularly one aspect of this invention relates to variable-impedance matched termination pairs.

BACKGROUND OF THE INVENTION

Low Voltage Differential Signaling (LVDS) is a signaling method used for high-speed transmission of binary data over copper. Typically, Low Voltage Differential Signaling uses a lower voltage swing than other transmission standards in order to deliver higher data transmission speeds at lower power consumption.

A differential signal represents a value as the difference between two physical quantities. In a strict sense, all voltage signals are differential, as a voltage can only be measured with respect to another voltage. In some systems, the reference against which a voltage is measured is the system 'ground'. Signaling schemes in which use 'ground' as the voltage measurement reference are called single-ended. This term is used because signals are represented by a voltage on a single conductor.

On the other hand, two conductors carry a differential signal. The signal value is the difference between the individual voltages on each conductor.

Figure 1:
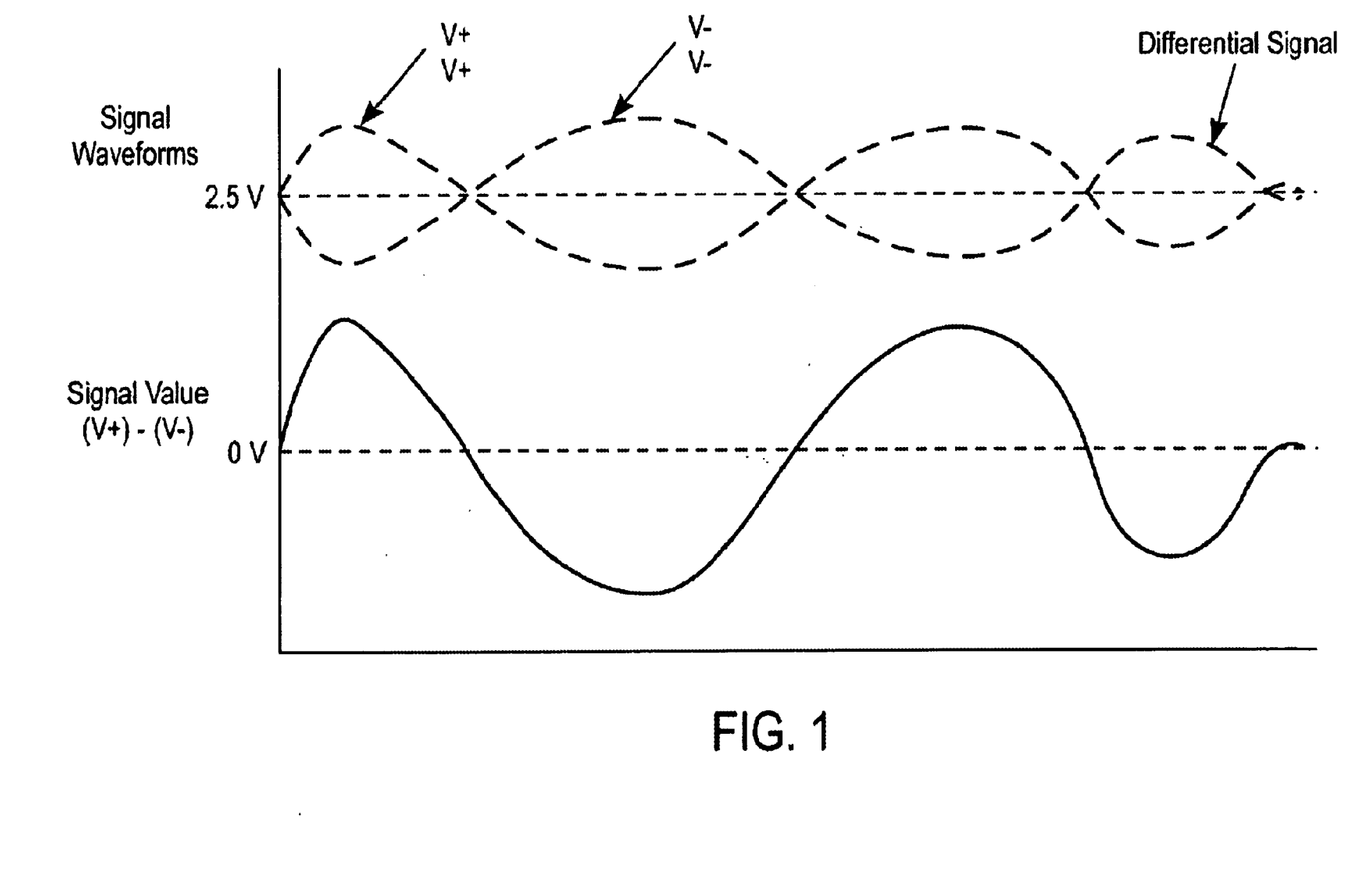
FIG. 1 illustrates a differential signal composed of two parts arbitrarily referred to as the positive signal V+ and the negative signal V−.

FIG. 1 illustrates a differential signal composed of two parts arbitrarily referred to as the positive signal V+ and the negative signal V−. The positive signal and the negative signal are ideally approximately opposite in phase with each other. As one goes up, the other goes down—but their average position, a 2.5 volt voltage level with respect to ground, remains the same. Further, the information transmitted in the differential signal is typically the voltage difference, sometimes referred to as signal value, between the positive signal and the negative signal. Mathematically, the signal value may be represented by V+ minus V−. FIG. 1 illustrates a sinusoidal type wave, nonetheless, the same principals apply for square waves as well.

Electrically, a pair of wires labeled V+ and V− carry the two parts of the differential signal. Typically, an LVDS driver converts a TTL/CMOS signal into a low-voltage differential signal. This differential signal can travel at rates such as 655 Mbps over media such as copper cables or printed circuit board traces to a LVDS receiver. The receiver then translates the differential signal back into a TTL/CMOS signal.

The first benefit of differential signaling is that because you are controlling the 'reference' voltage, smaller signals can be easily discriminated. In a ground-referenced, single-ended scheme, the exact value of the measured signal depends on the consistency of 'ground' within a system. The further apart the signal source and the signal receiver are, the greater the likelihood that discrepancy exists between the values of their local grounds. However, with LVDS, the values and characteristics of a matched termination pair resistors control the consistency of the difference value between the signals. Therefore, the better matched the termination pair is for the entire differential signal, the better the system can discern information with the smaller signals.

General purpose LVDS technology addresses point-to-point physical layer interfaces. These include intra-system connections via printed circuit board traces or cables. The ultimate rate and distance of LVDS data transfer is dependent on the attenuation characteristics of the media, the noise coupling to the environment, and the proper impedance terminations of the matched impedance termination pair. An improperly impedance termination may result in reflection waves and mode conversion.

Figure 2:
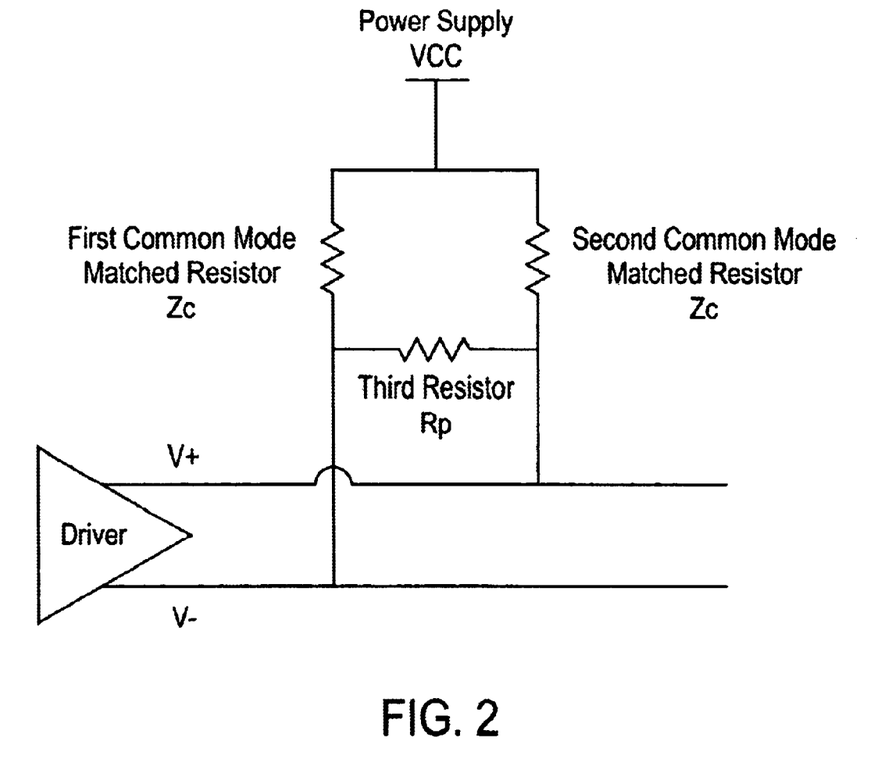
FIG. 2 illustrates a schematic diagram of prior art technique of using a matched termination pair for a low voltage differential signaling circuit.

FIG. 2 illustrates a schematic diagram of prior art technique of using a matched termination pair for a low voltage differential signaling circuit. The circuit contains a first common mode matched resistor, a second common mode matched resistor, a third resistor (Rp), an output of the V+ bus, an output of the V− bus, and a power supply. Commonly, a pair of common mode matched resistors are used to simultaneously match the differential mode impedance value and the common mode impedance value of a differential signal bus. Each common mode resistor is selected to the common mode impedance value, Ze resistance. Each common mode resistor connects to the power supply, Vcc, and the resistor Rp having its resistance equal to $2*\{Ze*Zo/(Ze-Zo)\}$, where Zo is the differential mode impedance value of the bus to the differential signal. Resistor Rp also connects between the two signal buses (V+ and V−) of the differential signaling pair. However, because resistor Rp connects the two signal buses of the pair, the steady-state and the common mode levels of the differential signal pair may be shifted and the differential signal swings can be severely reduced. These effects can degrade the common-mode level of the signals, the noise margin, and thus the signal integrity for the receivers. Further, the differential mode impedance value of the bus and the common mode noise may not be taken into account, which can cause signal integrity to degrade through generation of reflected waves.

BRIEF DESCRIPTION OF THE DRAWINGS

The drawings refer to the invention in which.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, circuit layouts of resistive components, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Further specific numeric references such as first driver, may be made. However, the specific numeric reference should not be interpreted as a literal sequential order but rather interpreted that the first driver is different than a second driver. Thus, the specific details set forth are merely exemplary. The specific details may be varied from and still be contemplated to be within the spirit and scope of the present invention. The term coupled is defined as meaning connected either directly or indirectly through another component.

In general, various apparatuses and methods are described that include a variable-impedance matched termination pair coupled to differential signaling bus pair. The differential signaling bus pair includes a first bus and a second bus. The variable-impedance matched termination pair includes a first variable-impedance component and a second variable-impedance component. The impedance value of each variable-impedance component depends on the voltage level sensed by that variable-impedance component. The first variable-impedance component couples to the first bus. The second variable-impedance component couples to the second bus. The first variable-impedance component is electrically isolated from the second variable-impedance component. In an embodiment, one or more parallel impedance paths within the variable-impedance components activate to change the variable-impedance value. In an embodiment, each variable-impedance component includes a reference voltage circuit. In an embodiment, each variable-impedance component shares a reference voltage circuit.

Figure 3:
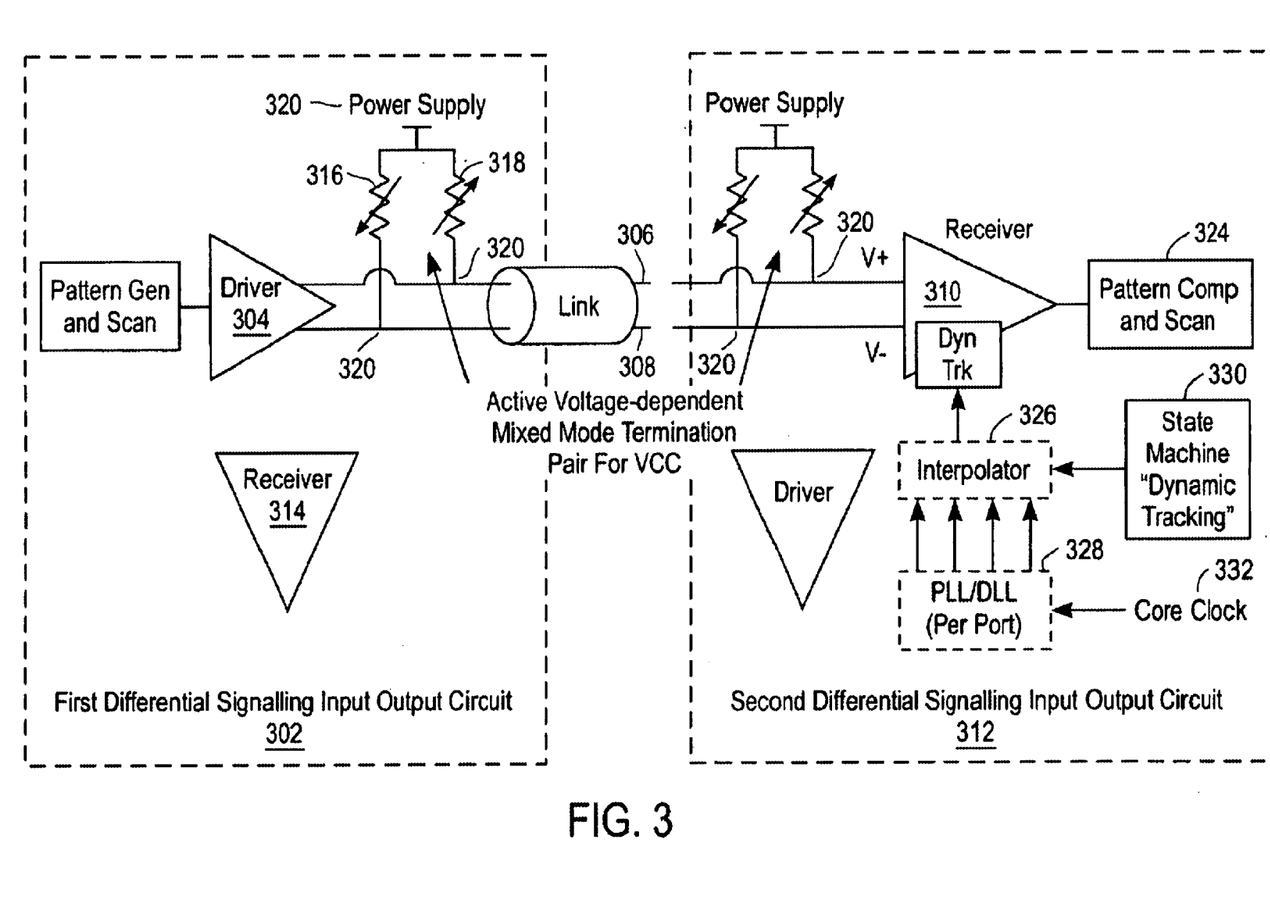
FIG. 3 illustrates a schematic diagram of an embodiment of a variable-impedance matched termination pair coupled to differential signaling bus pair.

FIG. 3 illustrates an embodiment of a variable-impedance matched termination pair coupled to differential signaling bus pair. A first differential signaling input output circuit 302 contains a first driver 304 that transmits a differential signal over a first bus 306 and a second bus 308 to a second receiver 310 in a second differential signaling input output circuit 312. The first differential signaling input output circuit 302 also contains a first receiver 314. The output of the first driver 304 and the input of the first receiver 314 share the same connection buses, the first bus 306 and the second bus 308. In an embodiment, the first bus 306 may be V+ and correspondingly the second bus 308 is V−. In an embodiment, the first bus 306 may be V− and correspondingly the second bus 308 is V+.

The variable-impedance matched termination pair may include a first variable-impedance component 316 and a second variable-impedance component 318. The first variable-impedance component 316 connects to the main power supply 320 (Vcc) on one side and the first bus 306 on the other side. The second variable-impedance component 318 connects to the main power supply (Vcc) on one side and the second bus 308 on the other side. The second variable-impedance component 318 is electrically isolated from the first variable-impedance component 316 because the lone potential current path between the two components is through the main power supply 320. Note, the matched termination pair does not use a resistive connection between the two buses of the pair; therefore, it avoids a cross signal integrity problem between the V+ bus and V− bus experienced by prior art techniques. In an embodiment, the variable-impedance matched termination pair may be used in mixed-mode circuits where noise is more prevalent. Mixed mode circuits are electronic circuits using both analog and digital signals in the same electronic circuit. In an embodiment, a differential signaling input output circuit may also contain components such as a pattern compensation and scanner 324, an interpolator 326, a phase lock loop 328, a state machine for dynamic tracking 330, and a core clock generator 332.

The second receiver 310 receives and decodes the differential signal transmitted by the first driver 304, typically, by reading the absolute value of the voltage on V+ minus the voltage on V−. For example, the voltage on the V+ bus may be 5.0 volts and the voltage on the V− minus bus may be 0 Volts. The difference between the two buses would be 5.0 volts with an average voltage of 2.5 volts. Similarly, the voltage on the V+ bus may be +2.5 volts and the voltage on the V− minus bus may be −2.5 Volts. The difference between the two buses would still be 5.0 volts but with an average voltage of 0 volts. The values of the voltages may be chosen by the circuit designer, but the principle of the transmitted information is that the voltage difference between the two buses remains the same.

Figure 4:
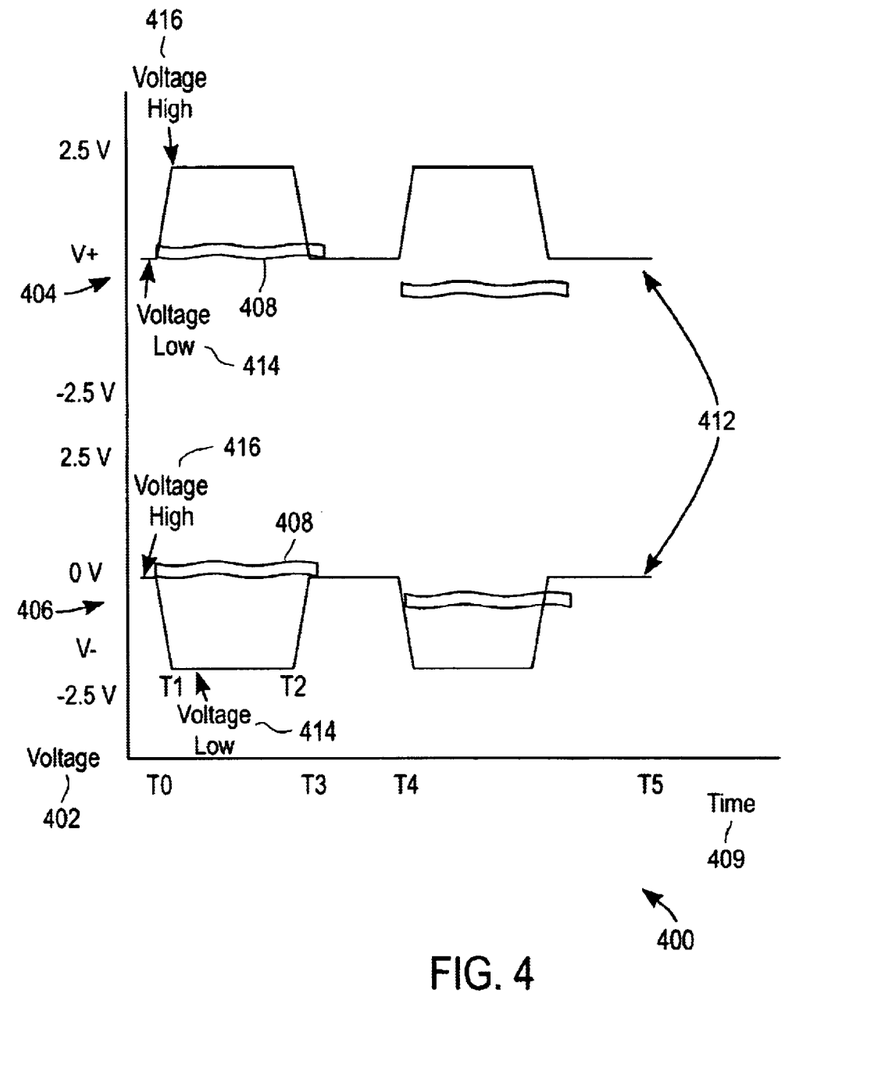
FIG. 4 illustrates a graph of an exemplary square wave differential signal and a common mode noise signal traveling with the differential signal.

FIG. 4 illustrates a graph of an exemplary square wave differential signal and a common mode noise signal traveling with the differential signal. Vertically, the graph 400 illustrates the amplitude measured in voltage 402 of the complimentary positive (V+) 404 and negative (V−) 406 square wave differential signal 412. Vertically, the graph 400 illustrates the amplitude measured in voltage 402 of the common mode noise signal 408. Horizontally, the graph illustrates the change of the complimentary differential signal 412 and the relationship of the common mode noise signal 408 to the differential signal 412 over time 409. Note, the amplitudes in voltage 402 of both the differential signal 412 and common mode noise signal 408 may not be drawn to scale and are meant to be illustrative.

At time zero (T0), the first driver transmits the differential signal 412 by increasing the voltage 402 on the V+ bus by 2.5 volts to +2.5 volts and decreasing the voltage 402 on the V− bus by 2.5 volts to −2.5 volts. On the V+ bus, the differential signal 412 transitions from a voltage low condition 414 to a voltage high condition 416. On the V− bus, the differential signal 412 transitions from a voltage high condition 416 to a voltage low condition 414.

Even mode current occurs when both the differential signal 412 and the common mode noise signal 408 share the same polarity. The corresponding matched impedance may be referred to as even mode impedance. At time zero (T0) on the V+ bus, the common mode noise signal 408 is positive and the differential signal 412 is also positive. At the beginning of time zero (T0) on the V+ bus, the first variable-impedance component possesses approximately an even mode impedance value to properly match for both the bus differential signal 412 and the bus common mode noise signal 408. Note, a parallel impedance path implementation to transition from the even mode impedance value to the odd mode impedance value will be described later. At time one (T1) on the V+ bus, when the differential signal 412 transitions to the voltage high condition 416, then the first variable-impedance component possesses approximately an odd mode impedance to properly match for both the bus differential signal 412 and the bus common mode noise signal 408. Note, in an embodiment, a mixed mode signal is the combined signal of an analog signal, such as the common mode noise, and a digital signal, such as the differential square wave.

Odd mode current occurs when the differential signal 412 and the common mode noise signal 408 have the opposite polarity. The corresponding matched impedance may be referred to as an odd mode impedance. At time zero (T0) on the V− bus, the common mode noise signal 408 is positive, however, the differential signal 412 is going negative. At the beginning of time zero (T0) on the V− bus, the second variable-impedance component possesses approximately an odd mode impedance to properly match for both the bus differential signal 412 and the bus common mode noise signal 408. At time one (T1) on the V− bus, when the differential signal 412 transitions to the voltage low condition 414, then the second variable-impedance component possesses approximately an even mode impedance to properly match for both the bus differential signal 412 and the bus common mode noise signal 408.

At time two (T2), the first driver starts decreasing the differential signal 412 on the V+ bus and starts increasing the differential signal 412 on the V− bus. Thus, the differential signal 412 on the V+ bus transitions from a high voltage condition 416 to a low voltage condition 414 and the first variable-impedance component transitions from an odd mode impedance value to an even mode impedance value. The differential signal 412 on the V− bus transitions from a low voltage condition 414 to a high voltage condition 416 and the second variable-impedance component transitions from an even mode impedance value to an odd mode impedance value.

At time three (T3), the differential voltage transition and value of the variable-impedance components transitions are complete.

At time four (T4), the common mode noise signal is negative. At time T4 on the V+ bus, the common mode noise signal 408 and differential signal 412 possess opposite polarities. On the V− bus, the common mode noise signal 408 and differential signal 412 share the same polarity. Thus, the even mode impedance and odd mode impedance relationships on the V+ and V− busses swap. Accordingly, the first variable-impedance component coupled to the V+ bus possesses an odd mode impedance and the second variable-impedance component coupled to the V− bus possesses an even mode impedance at the start of the signal transition. In an embodiment, the common mode noise may exist with either mainly positive polarity such as in T1 through T2 or mainly negative polarity such as in T4 through T5.

Referring to FIG. 3, the impedance value in the variable-impedance matched termination pair is dependent on the voltage present at the output 320 of each differential signaling circuit 302, 312. The impedance value in the matched impedance termination pair is dependent on the voltage in order to provide a properly matched termination throughout the entire differential signal voltage swing. A properly impedance matched termination creates high signal-integrity and eliminates reflected waves from improperly terminated ends. The even mode impedance and odd mode impedance for the matched termination pair may be selected using a formula that accounts simultaneously for both the bus differential signal and the bus common-mode noises such as SSO noise. The matched bus termination pair reduces reflection noises from the differential signal and from the common-mode noise simultaneously, leading to high signal integrity and high noise immunity against inter-symbol-interference (ISI) and overshoots.

In an embodiment, the impedance values of the pair are selected using the following formulas.

$$R+= -\{Ze-Zo\}\{(1-k)/(1+k)\}/2 +$$
$$Sqrt[\{Ze-Zo\}^2\{(1-k)/(1+k)\}^2 + 4*ZoZe]/2$$
$$R-= -\{Ze-Zo\}\{(1+k)/(1-k)\}/2 +$$
$$Sqrt[\{Ze-Zo\}^2\{(1+k)/(1-k)\}^2 + 4*ZoZe]/2$$

The even mode impedance (R+) equals the sum of a first negative quantity plus a second positive quantity, the entire quantity divided by two. The first negative calculated quantity equals the negative sum of the impedance of the bus to the common mode noises (Ze) minus the impedance of the bus to the differential signal (Zo) multiplied by the quantity of one minus the noise proportional constant to the differential mode signal (k) divided by one plus the noise proportional constant to the differential mode signal (k). The second positive quantity equals the square root of the squared sum of the impedance of the bus to the common mode (Ze) minus the impedance of the bus to the differential mode (Zo) multiplied by the squared quantity of one minus the noise proportional constant to the differential mode signal (k) divided by one plus the noise proportional constant to the differential mode signal (k), that calculated quantity plus four times the product of the impedance of the bus to the common mode (Ze) times the impedance of the bus to the differential mode (Zo). Referring to FIG. 4, the formula takes into account the impedance value of the matched termination pair for both the differential signal 412 and the common mode noise signal 408.

The odd mode impedance (R−) equals the sum of a first negative quantity plus a second positive quantity, the entire quantity divided by two. The negative first calculated quantity equals the negative sum of the impedance of the bus to the common mode noises (Ze) minus the impedance of the bus to the differential signal (Zo) multiplied by the quantity of one plus the noise proportional constant to the differential mode signal (k) divided by one minus the noise proportional constant to the differential mode signal (k). The second positive quantity equals the square root of the squared sum of the sum of the impedance of the bus to the common mode (Ze) minus the impedance of the bus to the differential mode multiplied by the squared quantity of one plus the noise proportional constant to the differential mode signal (k) divided by one minus the noise proportional constant to the differential mode signal (k), that calculated quantity plus four times the product of the impedance of the bus to the common mode (Ze) times the impedance of the bus to the differential mode (Zo). Note, in an embodiment, the formula may take into account other analog signals rather than the noise proportional constant with the appropriate mathematical substitutions. Also, the noise proportional constant can be defined as the ratio of the common mode noise amplitude to that of the differential signal.

In an embodiment, the common-mode noise's voltage proportional constant, k, and polarity can be estimated based on calculations, measurements, or simulations. Ideally, perfect differential signals eliminate noise such as Simultaneous Switching Outputs (SSO) noise; however, due to real physical mismatches, electrical mismatches, and core circuits' switching, common mode noise exists and should be accounted for to create a proper termination.

A process to create the even mode R+ impedance value or the odd mode R− impedance value can be accomplished automatically by using parallel connections of active voltage-dependent resistive elements, which may be implemented by transistor circuits, and an Nwell resistor of R+ value.

Figure 5:
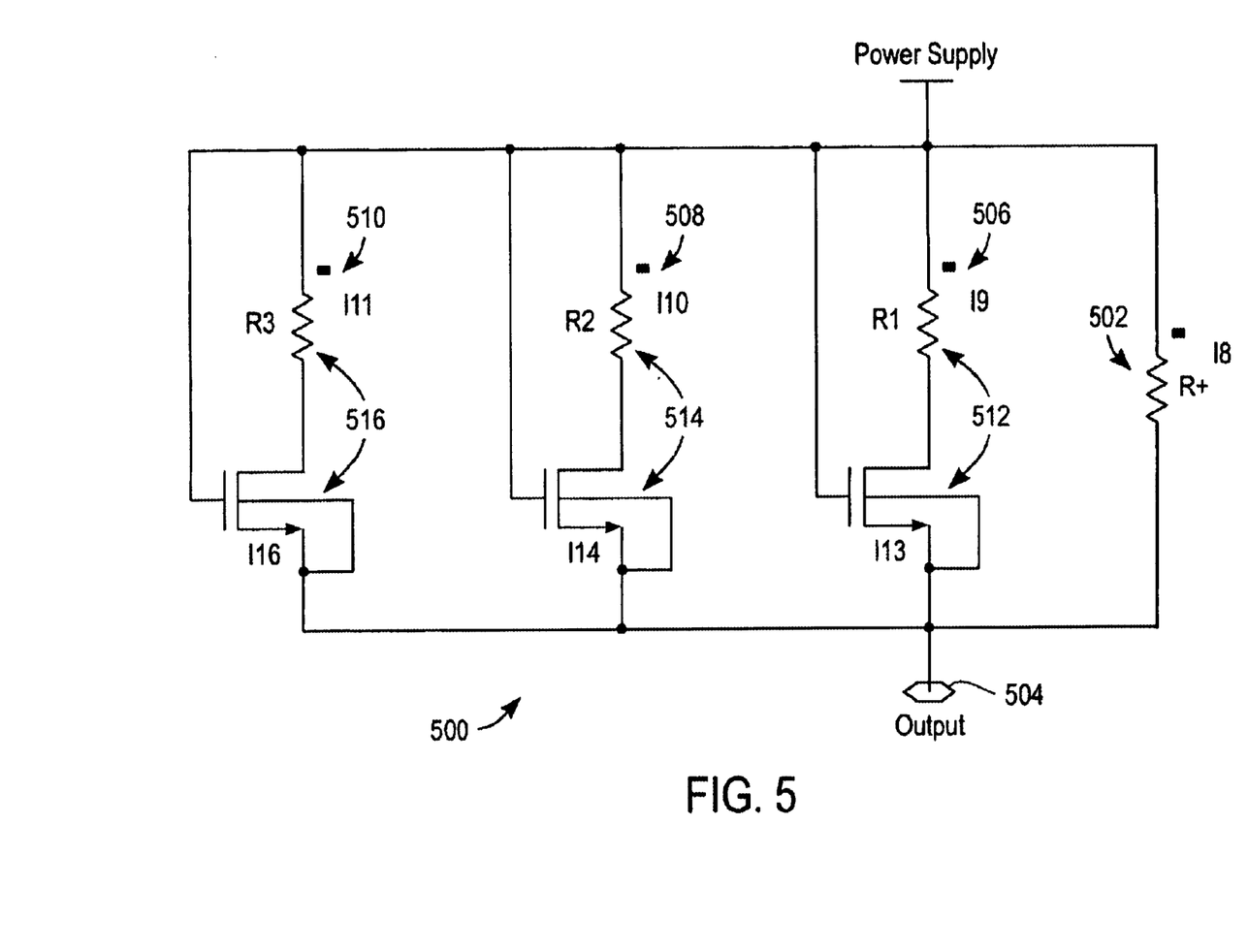
FIG. 5 illustrates a schematic diagram of an embodiment of a voltage-dependent variable-impedance component beginning with an even mode R+ impedance value for a voltage high to voltage low swing.

FIG. 5 illustrates a schematic diagram of an embodiment of a voltage-dependent variable-impedance component beginning with an even mode R+ impedance value for a differential signal voltage high to voltage low swing. The R− impedance value for the variable-impedance component 500 exists after the positive signal swing of voltage low to voltage high swing. The R+ impedance value for the variable-impedance component 500 exists after the positive signal swing of voltage low to voltage high. The R+ Nwell resistor 502 having the impedance value obtained from the equation above connects the output 504 of the differential signaling input output circuit and the positive power supply. Three NMOS-resistor series connections: I13-R1 512, I14-R2 514, and I16-R3 516, connect in parallel fashion to resistor R+ 502 such that the total termination impedance, Rout, decreases in value from the R+ impedance value to the R− impedance value, as voltage on the output, Vout, swings from voltage high to voltage low, and vice versa.

Ohm's law teaches that adding additional resistive paths in parallel causes the total impedance of the entire resistive path to decrease. For example, if impedance value of resistor R+ 502 equals one hundred thousand kilo ohms, then each additional activated parallel circuit 506, 508, 510 may decrease the total impedance by twenty thousand kilo ohms. Similarly, deactivating or cutting off parallel resistive paths 506, 508, 510 causes the total impedance of the entire resistive path to increase back up to a maximum value of R+.

In an embodiment, when the voltage on the output 504 equals the voltage high condition all of transistors in the parallel resistance paths 506, 508, 510 are off and the impedance value of Rout equals the impedance value of resistor R+ 502. No parallel paths of resistance 506, 508, 510 have been activated. NMOS-resistor R1 and I13 512 are sized such that I13 conducts in its linear region when signal voltage present at the output 504 of the differential signaling circuit is approximately equal to two-third of the differential signal swing. Thus, I13 starts conducting in its linear range when the differential signal is at approximately ⅔ of voltage high minus voltage low. I13's resistance together with R1 reduces the impedance value of Rout by a third of its way from the R+ value to the R− value. The first parallel impedance path 506 has been activated to change the impedance of the variable-impedance component 500 to match the current voltage level on the bus including during the differential signal swing. When the differential signal voltage at output 504, Vout, is at approximately one-third of the swing, then the I14 conducts linearly and further reduces the impedance value of Rout by two-thirds of its way from the R+ value to the R− value. The second parallel impedance path 508 has been activated to change the impedance of the variable-impedance component 500 to match the current voltage level on the bus including during the differential signal swing. When the signal voltage at the output 504 equals voltage low, then the I16 conducts linearly and with R3 reduces the value of Rout to the value of R−. More branches of NMOS and an Nwell resistor can be added or removed to adjust the R+ to R− range with the Vout swing.

In an embodiment, when the common mode noise is negative, then the matched impedance termination pair may use a voltage-dependent variable-impedance component beginning with even mode R+ impedance value for a differential signal voltage high to voltage low swing.

Figure 6:
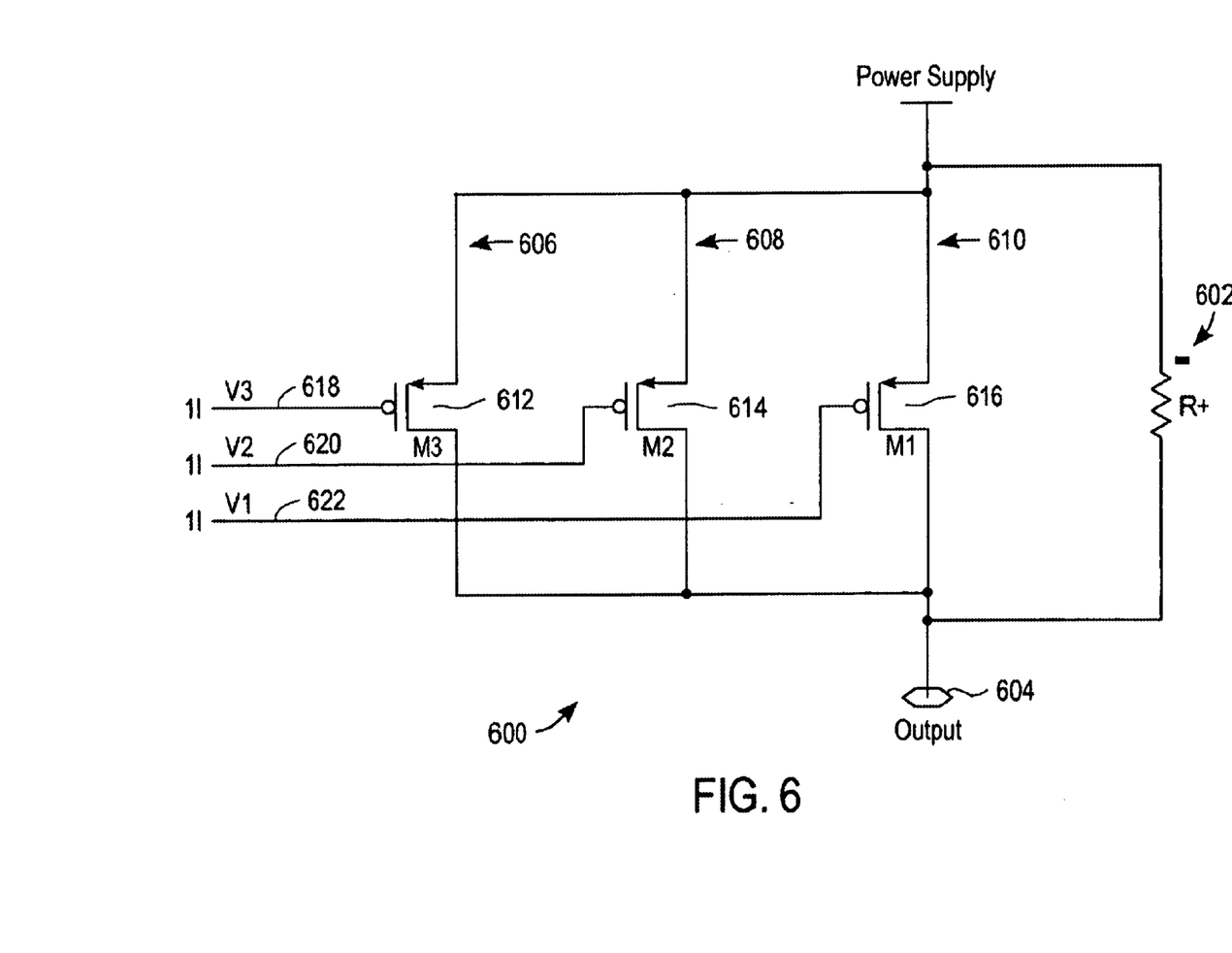
FIG. 6 illustrates a schematic diagram of an embodiment of a voltage-dependent variable-impedance component beginning with an even mode R+ impedance value for a voltage low to a voltage high swing.

FIG. 6 illustrates a schematic diagram of an embodiment of a voltage-dependent variable-impedance component beginning with an even mode R+ impedance value for a differential signal voltage low to a voltage high swing. The R+ impedance value for the variable-impedance component 600 exists after the negative signal swing of voltage high to voltage low swing. The R− impedance value for the variable-impedance component 600 exists after the positive signal swing of voltage low to voltage high. An R+ Nwell resistor 602 having the impedance value obtained from the equation above connects to the output 604 of the differential signaling input output circuit and the positive power supply. PMOS transistors, 612–616, connect in parallel fashion to R+ such that during the negative voltage high to voltage low swing, the total output resistance, Rout, changes gradually from the R− impedance value to the R+ impedance value and vice versa. PMOS transistors M1 to M3 612–616 selectively activate dependant on the voltage sensed at the output to change their resistances from the low linear values to the high saturation values, and vice versa. Thus, the parallel impedance paths 606, 608, 610 activate to change the impedance of the variable-impedance component 600 to match the mixes mode impedance of the bus. The mixed mode impedance value takes into account the current voltage level in the differential signal as well as the voltage level of the common mode noise signal.

In an embodiment, four fixed impedance values exist for the variable-impedance component during the continuously changing differential signal swing. A different fixed impedance value exists each time a new parallel impedance path 606, 608, 610 activates or deactivates. Thus, the variable-impedance component 600 impedance matches substantially throughout the entire differential signal swing.

Bias voltages V1, V2 and V3 are set by a voltage reference such that when the voltage at the output equals the voltage high condition, then PMOS transistors M1–M3 612–616 are in their low-resistance linear regions and the output impedance, Rout, is approximately the impedance value of R−. Bias voltage V3 is greater than bias voltage V2, which is greater than bias voltage V1. As the output swings down approximately equal to or lower than V3, then PMOS transistor M3 612 moves into its saturation region, while PMOS transistors M2–M1 614, 616 are still linear which causes the value of Rout to increase to a third of its way from the R− impedance value to the R+ impedance value. When the voltage at the output 604 is approximately equal to or lower than the level of V2, then both PMOS transistors M3 612 and M2 614 are in their saturation regions, while M1 616 is still in its linear region. This causes the impedance value of Rout to further increase closer to two-third of its way from the R− impedance value to the R+ impedance value. Finally, when the voltage at the output is equal to or lower than V1, then PMOS transistors M1–M3 612–616 are in their saturation regions, and Rout is increased to the R+ impedance value.

In similar fashion, Rout is decreased from the R+ impedance value to the R− impedance value as the output signal swings from voltage low to voltage high. In an embodiment, bias voltage V3 is set at Vcc minus Vtp, Vtp is M3's threshold voltage level. In an embodiment, V1 is set at Vcc minus three times Vtp. In an embodiment, V2 is set at Vcc minus Vtp. In an embodiment, the widths and lengths of PMOS transistors M1–M3 612–616 together with their Vtp's are selected such that their linear resistances increase Rout from R− to R+, sequentially as described above. In an embodiment, more PMOS transistors can be added or removed to fit the signal swing range with the Rout's range. In an embodiment, when the common mode noise is positive, then the match impedance termination pair may use a voltage-dependent variable-impedance component beginning with an even mode R+ impedance value for a differential signal voltage low to a voltage high swing.

Figure 7:
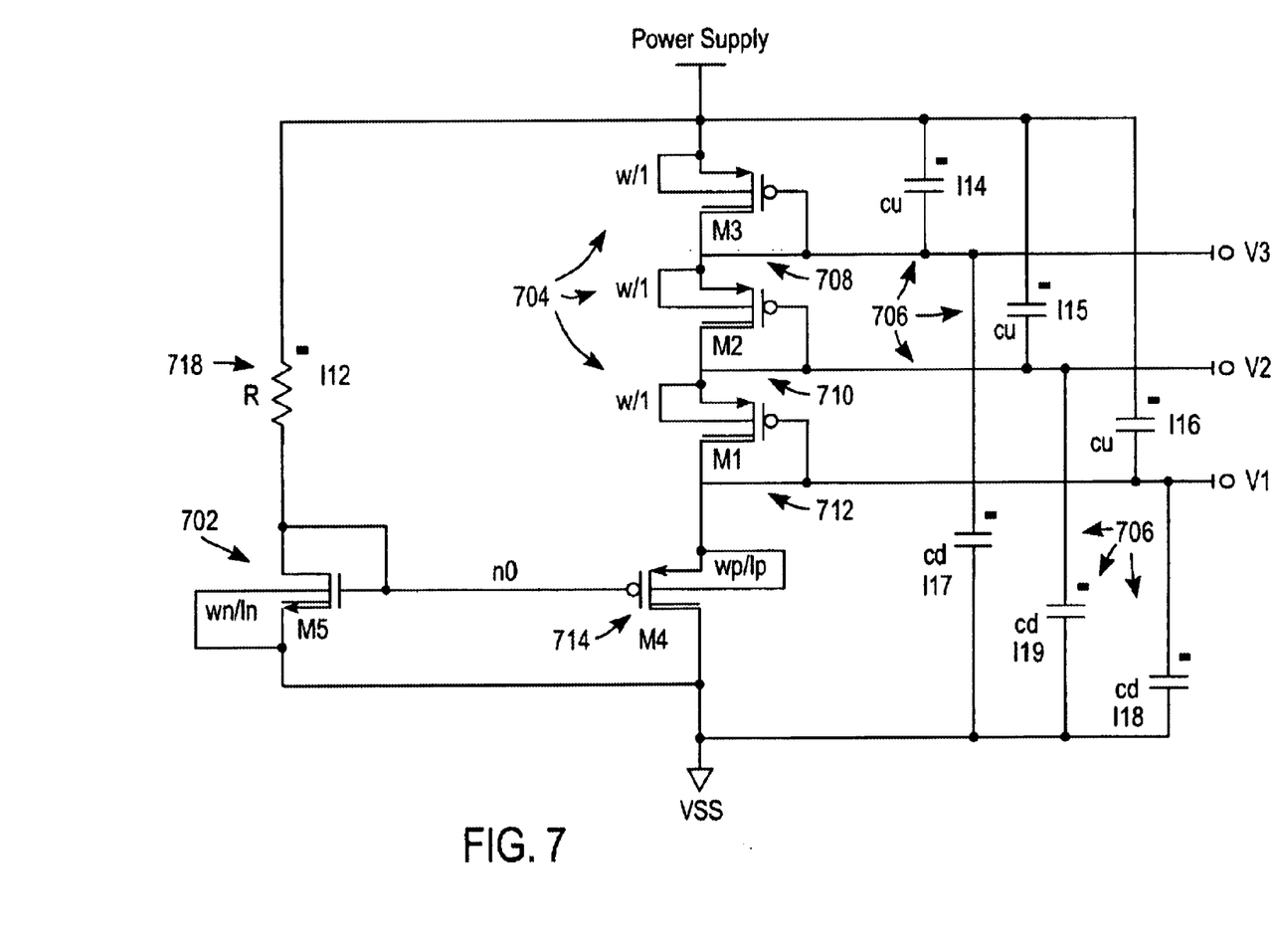
FIG. 7 illustrates a schematic diagram of an embodiment of a voltage reference circuit to supply biasing voltages to a voltage-dependent variable-impedance component.

FIG. 7 illustrates a schematic diagram of an embodiment of a voltage reference circuit to supply biasing voltages to a voltage-dependent variable-impedance component. The voltage reference for V1–V3 from FIG. 6 may use this voltage-controlled voltage source 702 and PMOS diode stack 704 with load capacitors 706. The output 708, 710, 712 of each diode in the PMOS diode stack 704 of M3–M1 acts as a different reference bias voltage such as V1, V2, and V3. Voltage-controlled voltage source M5 702 may be sized to source a current equal to the driver's current at a voltage low condition in order to generate the value of the voltage low signal at the gate of M4 714. Voltage-controlled voltage source M5 702 sources a current equal to the driver's current at a voltage low condition across the Nwell resistor of R value equal to the driver's impedance 718. M4 714 acts as the source follower, duplicating at the V1 output the value of the voltage low amplitude less M4's source-gate voltage threshold (Vsg).

In an embodiment, M4 714 sources significant current to the diode stack 704 and thus M4's Vsg is quite low. Thus, the value of V1 is slightly higher than the value of the voltage low signal of the output. PMOS's M3–M1 708, 710, 702 act as diodes so that the value of V2 is approximately one-third of the voltage high to voltage low swing. The value of V3 is approximately two-third of the voltage high to voltage low swing. In an embodiment, the load capacitors 706 further reduce the voltage feed through from the differential output swings. These load capacitors 706 also act as decoupling capacitors for power supplies.

Figure 8:
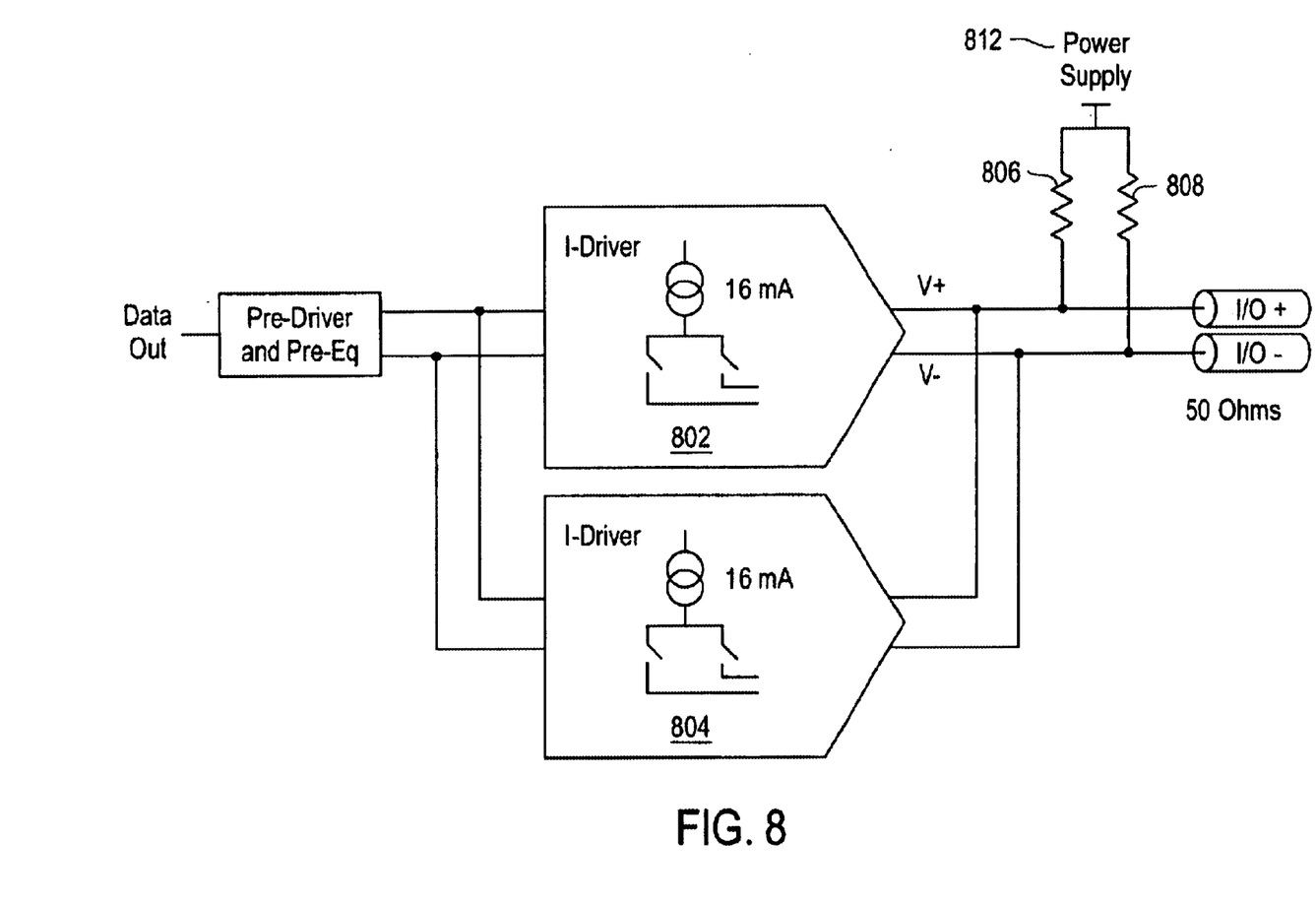
FIG. 8 illustrates a schematic diagram of an embodiment differential signaling input-output circuit having two current driver components making up the first driver.

FIG. 8 illustrates a schematic diagram of an embodiment differential signaling input-output circuit having two current driver components making up the first driver. The first driver may consist of a first current driver 802 coupled to the first variable-impedance component 806 and a second current driver 804 coupled to the second variable-impedance component 808. Each current driver 802, 804 develops a portion of the differential signal through the respective variable-impedance component, 806, 808. Each variable-impedance component 806, 808 coupled the output 810 of the first driver and the positive power supply 812.

Figure 9:
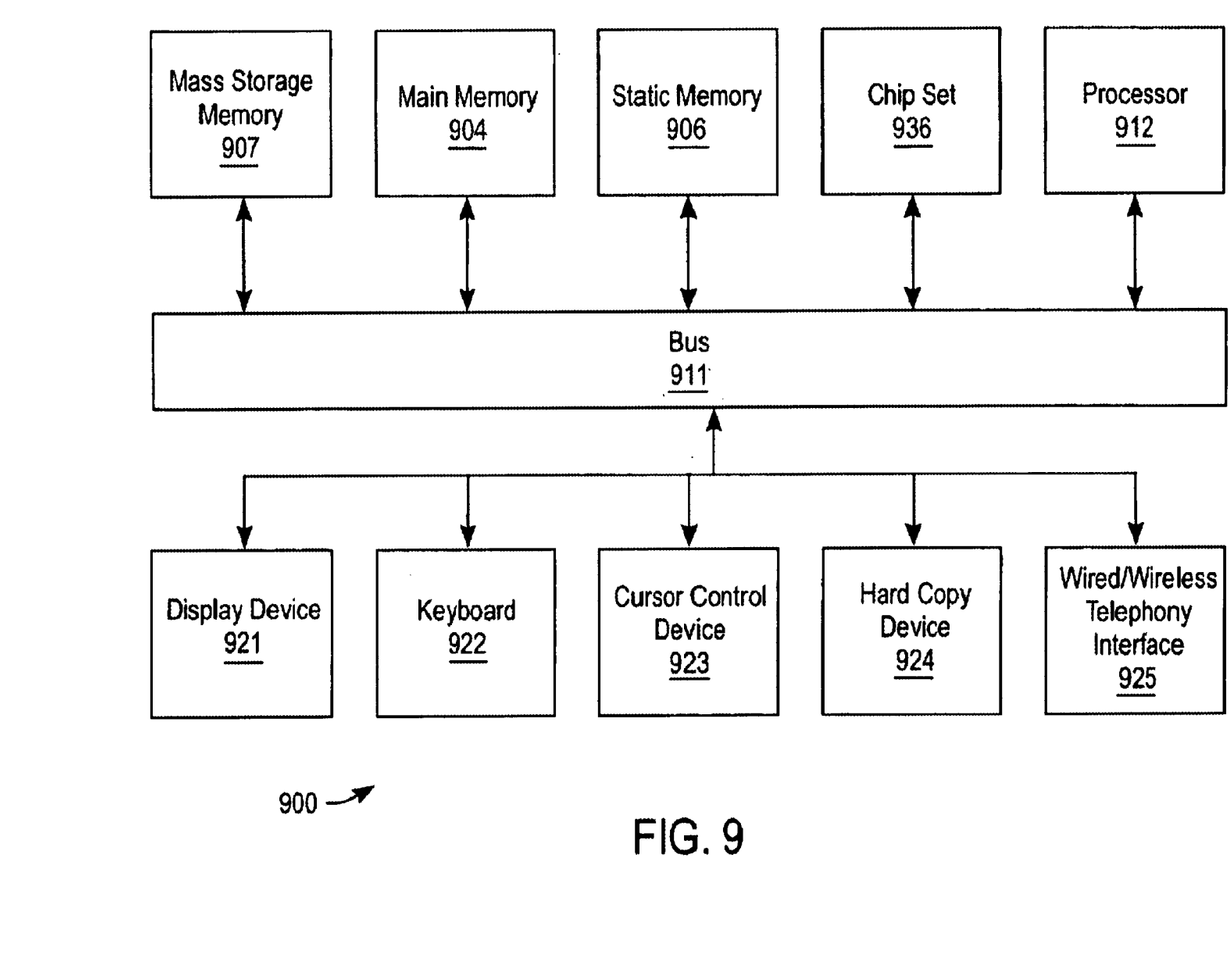
FIG. 9 illustrates a block diagram of an exemplary computer system that may use differential signaling input-output circuits.

FIG. 9 illustrates a block diagram of an exemplary computer system that may use differential signaling input-output circuits. In one embodiment, computer system 900 comprises a communication mechanism or bus 911 for communicating information, and an integrated circuit component such as a processor 912 coupled with bus 911 for processing information. One or more of the components or devices in the computer system 900 such as the processor 912 may use differential signaling input-output circuit to communicate across the bus. Further, one or more of the components or devices in the computer system may use differential signaling input-output circuits to transmit communications internally within that component.

Computer system 900 further comprises a random access memory (RAM), or other dynamic storage device 904 (referred to as main memory) coupled to bus 911 for storing information and instructions to be executed by processor 912. Main memory 904 also may be used for storing temporary variables or other intermediate information during execution of instructions by processor 912. In an embodiment, the Processor 912 may include a microprocessor, but is not limited to a microprocessor, such as a Pentium, PowerPC, etc.

Computer system 900 also comprises a read only memory (ROM) and/or other static storage device 906 coupled to bus 911 for storing static information and instructions for processor 912, and a mass storage memory 907, such as a magnetic disk or optical disk and its corresponding disk drive. Mass storage memory 907 is coupled to bus 911 for storing information and instructions.

Computer system 900 may further be coupled to a display device 921, such as a cathode ray tube (CRT) or liquid crystal display (LCD), coupled to bus 911 for displaying information to a computer user. An alphanumeric input device (keyboard) 922, including alphanumeric and other keys, may also be coupled to bus 911 for communicating information and command selections to processor 912. An additional user input device is cursor control device 923, such as a mouse, trackball, trackpad, stylus, or cursor direction keys, coupled to bus 911 for communicating direction information and command selections to processor 912, and for controlling cursor movement on a display device 912.

Another device that may be coupled to bus 911 is a hard copy device 924, which may be used for printing instructions, data, or other information on a medium such as paper, film, or similar types of media. Furthermore, a sound recording and playback device, such as a speaker and/or microphone (not shown) may optionally be coupled to bus 911 for audio interfacing with computer system 900. Another device that may be coupled to bus 911 is a wired/wireless communication capability 925 to communication to a phone.

While some specific embodiments of the invention have been shown the invention is not to be limited to these embodiments. For example, one skilled in the art will recognize that multiple different circuit layouts and electronic components may be used to make voltage dependant parallel impedance paths to impedance match the differential signal throughout substantially the entire differential signal swing. The invention is to be understood as not limited by the specific embodiments described herein, but only by scope of the appended claims.

I claim:

1. An apparatus, comprising:
   a differential signaling bus pair including a first bus and a second bus; and
   a variable-impedance matched termination pair including a first variable-impedance component and a second variable-impedance component electrically isolated from each other and coupled to the first bus and second bus respectively, wherein the impedance value of the first variable-impedance component depends on the voltage level on the first bus, wherein the impedance value of the second variable-impedance component depends on the voltage level on the second bus, wherein the variable-impedance matched termination pair is matched for both a differential mode impedance and a common mode impedance.

2. The apparatus of claim 1, wherein impedance of each variable-impedance is varied by activating one or more parallel impedance paths within the first variable-impedance component.

3. The apparatus of claim 1, wherein the variable-impedance component includes a reference voltage circuit.

4. The apparatus of claim 1, wherein the first variable-impedance component includes a fixed resistive component.

5. The apparatus of claim 4, wherein the fixed resistive component comprises an N-well resistor.

6. The apparatus of claim 1, wherein the first variable-impedance component possess an even mode impedance value for a differential signal voltage low to a voltage high swing.

7. The apparatus of claim 1, wherein the first variable-impedance component possesses an even mode impedance value for a differential signal voltage high to a voltage low swing.

8. The apparatus of claim 1, wherein the impedance value of an even mode signal impedance (R+) and an odd mode signal impedance (R−) for the at least one component is calculated from the following equation:

$$R+ = -\{Ze - Zo\}\{(1-k)/(1+k)\}/2 + Sqrt[\{Ze - Zo\}^2\{(1-k)/(1+k)\}^2 + 4*ZoZe]/2, \text{ and}$$
$$R- = -\{Ze - Zo\}\{(1+k)/(1-k)\}/2 + Sqrt[\{Ze - Zo\}^2\{(1+k)/(1-k)\}^2 + 4*ZoZe]/2.$$

9. The apparatus of claim 1, wherein the first bus comprises a V+ bus of a differential signaling bus.

10. The apparatus of claim 1, wherein the first bus comprises a V− bus of a differential signaling bus.

11. An apparatus, comprising:
a power supply;
a differential signaling input-output circuit having an output; and
a resistive termination pair matched for both a differential signal and a common mode noise signal, the resistive pair including at least one component having a variable-impedance dependent on a voltage level sensed at the output of the differential signaling input output circuit, the resistive termination pair coupled to the output and the power supply.

12. The apparatus of claim 11, wherein the resistive termination pair impedance matches for mixed mode signals.

13. The apparatus of claim 11, wherein the resistive termination pair impedance matches the differential signal and the common mode noise signal throughout substantially the entire differential signal swing.

14. The apparatus of claim 11, wherein the resistive termination pair includes a reference voltage circuit.

15. The apparatus of claim 11, wherein the resistive termination pair includes a first impedance component and a second impedance component, the first impedance component is electrically isolated from the second impedance component.

16. The apparatus of claim 11, wherein the impedance value of an even mode signal impedance (R+) and an odd mode signal impedance (R−) for the at least one component is calculated from the following equation:

$$R+ = -\{Ze - Zo\}\{(1-k)/(1+k)\}/2 + Sqrt[\{Ze - Zo\}^2\{(1-k)/(1+k)\}^2 + 4*ZoZe]/2, \text{ and}$$
$$R- = -\{Ze - Zo\}\{(1+k)/(1-k)\}/2 + Sqrt[\{Ze - Zo\}^2\{(1+k)/(1-k)\}^2 + 4*ZoZe]/2.$$

17. A method, comprising:
varying impedance in an impedance matched termination pair based upon the voltage level sensed at the output of a differential input output circuit; and
impedance matching a differential signal and a common mode noise signal throughout substantially the entire differential signal swing.

18. The method of claim 17, further comprising:
electrically isolating a first variable-impedance component in a matched termination pair from a second variable-impedance component in the matched termination pair.

19. The method of claim 17, further comprising:
biasing reference voltages in the matched termination pair to activate one or more parallel impedance paths during the differential signal swing.

20. The method of claim 17, further comprising:
impedance matching the matched termination pair for a mixed-mode signal.

21. An apparatus, comprising:
means for varying impedance in an impedance matched termination pair based upon the voltage level sensed at the output of a differential input output circuit; and
means for impedance matching a differential signal and a common mode noise signal throughout substantially the entire differential signal swing.

22. The apparatus of claim 21, further comprising:
means for electrically isolating a first variable-impedance component in a matched termination pair from a second variable-impedance component in the matched termination pair.

23. The apparatus of claim 21, further comprising:
means for biasing reference voltages in the matched termination to activate one or more parallel impedance paths during the differential signal swing.

24. A computer system, comprising:
one or more integrated circuits containing one or more differential signaling input-output circuits, each differential signaling input-output circuit having an output; and
at least one of the one or more differential signaling input-output circuits coupling to a variable-impedance matched termination pair that includes a first variable-impedance component and a second variable-impedance component, the first variable-impedance component coupling to the first bus, the second variable-impedance component coupling to the second bus, the impedance value of the first variable-impedance component depends on the voltage level on the first bus, the impedance value of the second variable-impedance component depends on the voltage level on the second bus, wherein the variable-impedance matched termination pair is matched for both an even mode impedance and an odd mode impedance.

25. The computer system of claim 24, wherein the first variable-impedance component is electrically isolated from the second variable-impedance component.

26. The computer system of claim 24, wherein the first variable-impedance component impedance matches the differential signal throughout substantially the entire differential signal swing.

27. An apparatus, comprising:
- a differential signaling bus pair including a first bus and a second bus;
- a variable-impedance matched termination pair including a first variable-impedance component and a second variable-impedance component, the first variable-impedance component coupling to the first bus, the second variable-impedance component coupling to the second bus, the first variable-impedance component is electrically isolated from the second variable-impedance component, the impedance value of the first variable-impedance component depends on the voltage level on the first bus, the impedance value of the second variable-impedance component depends on the voltage level on the second bus, and the variable-impedance matched termination pair impedance matches a differential signal throughout substantially the entire differential signal swing, wherein the variable-impedance matched termination pair is matched for both an even mode impedance and an odd mode impedance.

28. The apparatus of claim 27, wherein the first variable-impedance component impedance matches for a mixed mode signal.

29. The apparatus of claim 27, wherein the apparatus further comprises a differential signaling circuit having a first driver and a first receiver, the differential signaling circuit coupling to the differential signaling bus pair and the a variable-impedance matched termination pair.

30. The apparatus of claim 27, further comprising:
- a positive power supply, the first variable-impedance component coupling to the first bus and the positive power supply, the second variable-impedance component coupling to the second bus and the positive power supply.

31. An apparatus, comprising:
- a differential signaling bus pair including a first bus and a second bus; and
- a variable-impedance matched termination pair including a first variable-impedance component and a second variable-impedance component electrically isolated from each other and coupled to the first bus and second bus respectively, wherein the impedance value of the first variable-impedance component depends on the voltage level on the first bus, wherein the impedance value of the second variable-impedance component depends on the voltage level on the second bus, wherein the impedance value of an even mode signal impedance (R+) and an odd mode signal impedance (R−) for the at least one component is calculated from the following equation:

$$R+ = -\{Ze - Zo\}\{(1-k)/(1+k)\}/2 +$$
$$Sqrt[\{Ze - Zo\}^2\{(1-k)/(1+k)\}^2 + 4*ZoZe]/2, \text{ and}$$
$$R- = -\{Ze - Zo\}\{(1+k)/(1-k)\}/2 +$$
$$Sqrt[\{Ze - Zo\}^2\{(1+k)/(1-k)\}^2 + 4*ZoZe]/2.$$

* * * * *